Aug. 19, 1947.  M. WATTER  2,425,972
AIRCRAFT CONSTRUCTION FOR HANDLING CARGO
Filed May 13, 1944  3 Sheets-Sheet 1
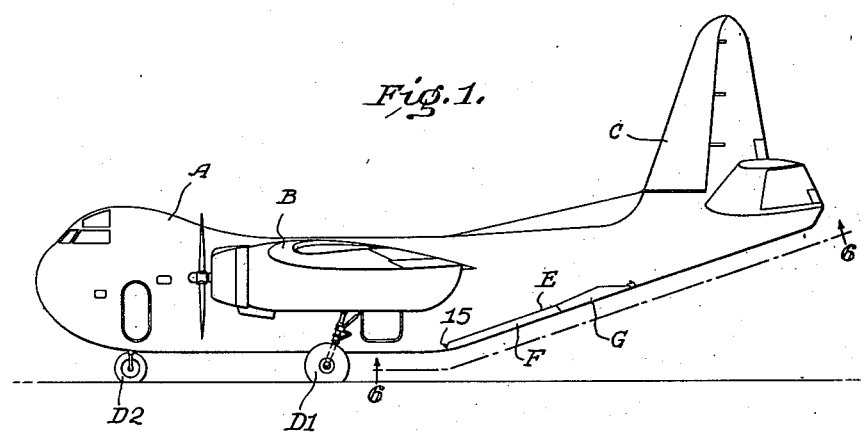
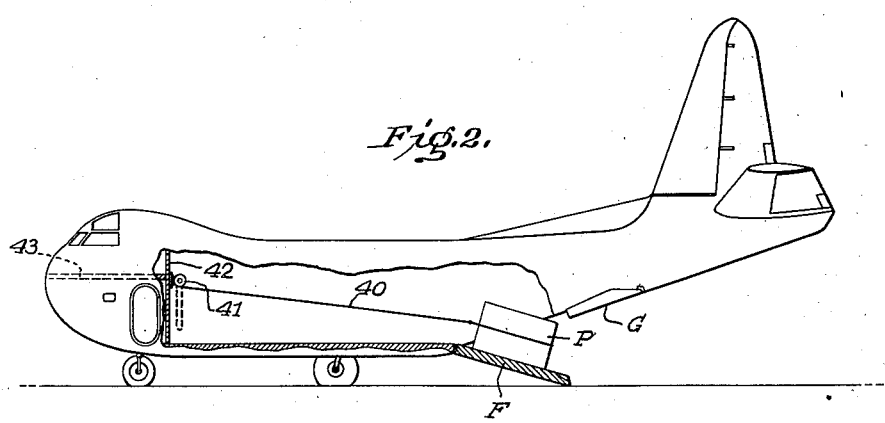
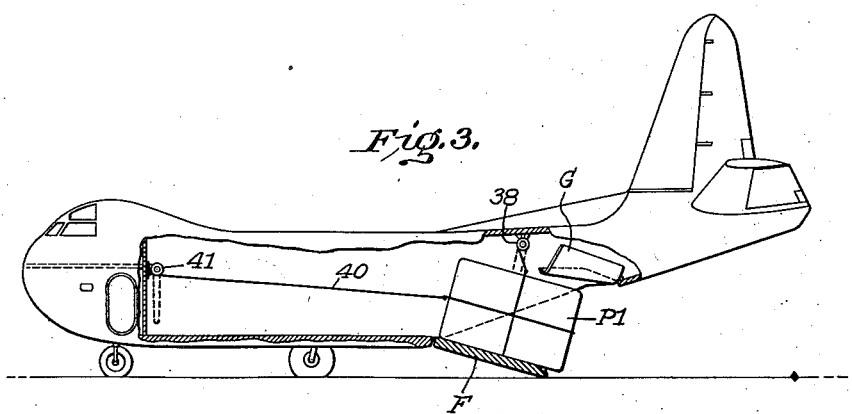
INVENTOR
Michael Watter
BY John P. Tarbox
ATTORNEY Aug. 19, 1947. M. WATTER 2,425,972
AIRCRAFT CONSTRUCTION FOR HANDLING CARGO
Filed May 13, 1944 3 Sheets-Sheet 2
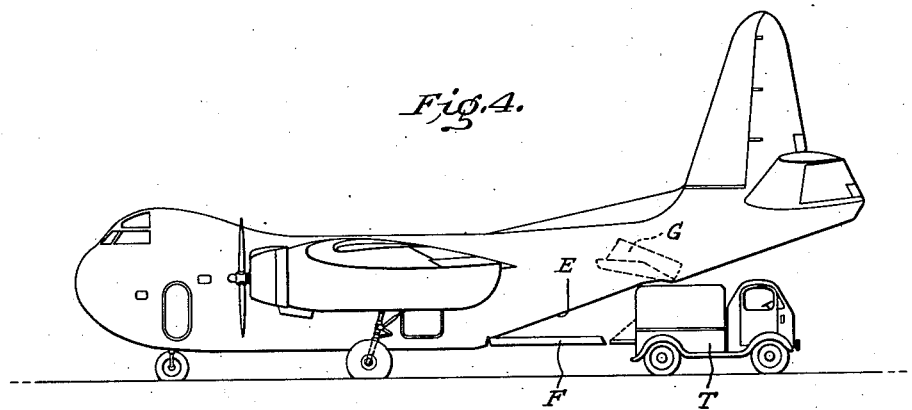
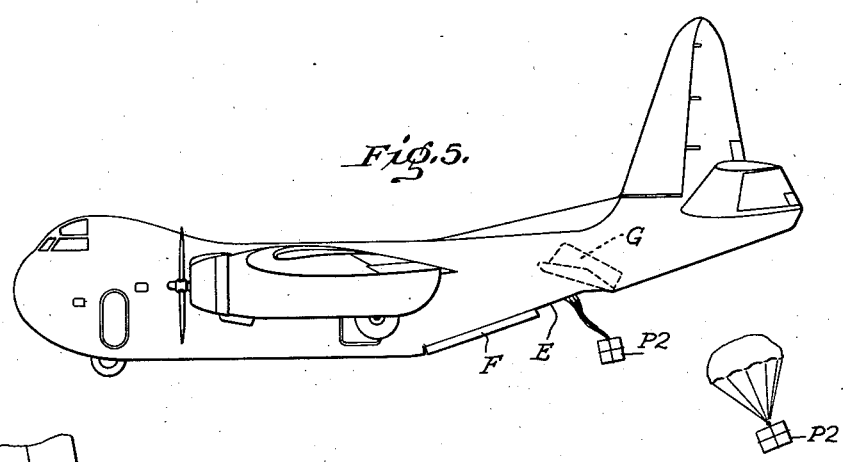
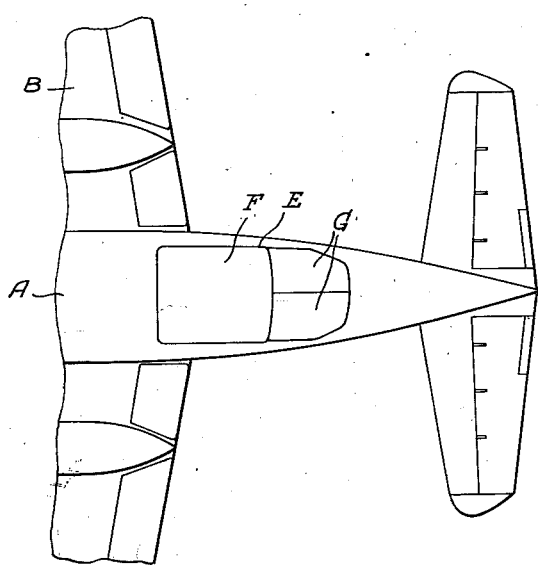
INVENTOR
Michael Watter
BY John P. Tarbox
ATTORNEY Aug. 19, 1947.                M. WATTER                2,425,972
                AIRCRAFT CONSTRUCTION FOR HANDLING CARGO
                    Filed May 13, 1944          3 Sheets-Sheet 3
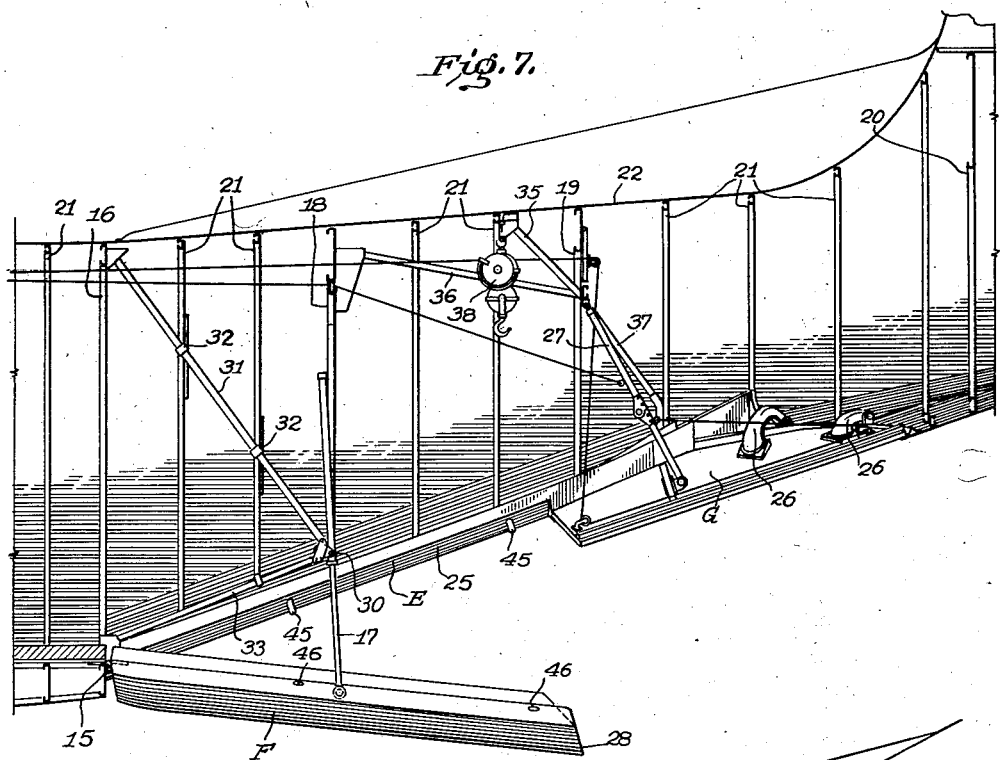
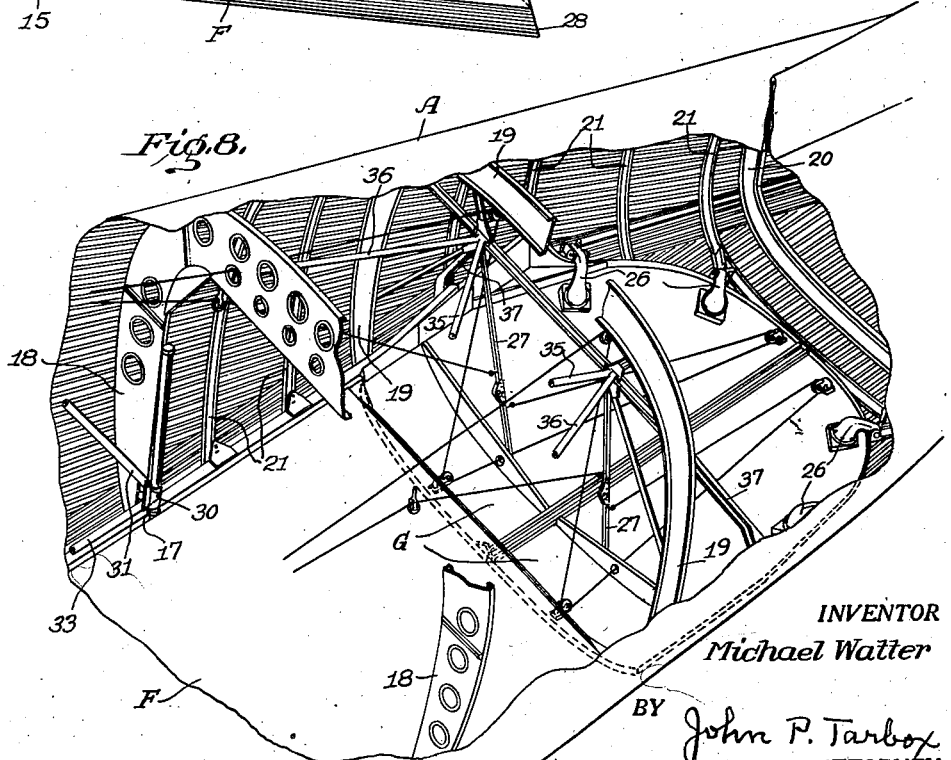
INVENTOR
Michael Watter
BY John P. Tarbox
ATTORNEY Patented Aug. 19, 1947

2,425,972

UNITED STATES PATENT OFFICE 2,425,972

AIRCRAFT CONSTRUCTION FOR HANDLING CARGO

Michael Watter, Philadelphia, Pa., assignor to The Budd Company, Philadelphia, Pa., a corporation of Pennsylvania Application May 13, 1944, Serial No. 535,460

18 Claims. (Cl. 244—137)

1

This invention relates to airplane construction and particularly to fuselage or body construction, and has for an object the provision of improvements in this art.

In my copending application Serial No. 451,390, filed July 18, 1942, I have disclosed an airplane provided with a ramp closure hinged to the front edge of an access opening in the lower side of an upwardly inclined rear portion of a fuselage. In the present application, the details of construction and a new assembly in this region will be described.

One of the particular objects of the invention is to provide improved closure means including a ramp and clearance doors for an under-body opening, such as will provide the maximum head clearance for the minimum length of opening but without an excessive inclination of the ramp.

Another object is to provide the maximum strength in the body across the opening but with the minimum weight.

Another object is to provide improved hinge and operating means for the clearance doors behind the ramp.

Another object is to provide hoist means which will conveniently serve its intended purpose and also provide additional reinforcement in the body frame.

The above-mentioned and other objects and advantages of the invention will be apparent from the following description of an illustrative embodiment thereof, reference being made to the accompanying drawings, wherein:

Figure 1 is a side elevation of an airplane embodying the invention, the airplane being shown resting on the ground;

Figure 2 is a view on a central vertical plane with the ramp down;

Figure 3 is a view like Figure 2 with all closures in open position;

Figure 4 is a similar view with the ramp partly raised and the clearance doors open;

Figure 5 is a similar view with the ramp fully closed and the clearance doors open;

Figure 6 is a plan view taken on the line 6—6 of Figure 1 looking upward;

Figure 7 is a central vertical section showing the structure in more detail; and Figure 8 is a top perspective view with the covering cut away, looking toward the rear in the clearance door region.

Referring to the drawings, the airplane comprises a body or fuselage A, wings B, a tail or empennage C, and tricycle landing gear including main wheels D1 and a nose wheel D2.

2

The rear part of the fuselage between the wings and the tail is inclined upwardly on the lower side and is provided with an access opening E closed by a ramp F and clearance doors G.

The ramp is hinged at its front end by a transverse hinge 15 of the piano type in the region of a strong body girdle or bulkhead 16, the bulkhead being made strong by giving it a wide or deep cross-section, as shown at the top of Fig. 7. The ramp is raised and lowered by screw struts 17 on each side near the mid-length, the struts being anchored in the region of an especially strong deep-section U-shaped bulkhead 18. Near and somewhat behind the rear end of the ramp another strong deep-section U-shaped bulkhead 19 is provided; and in the region near and somewhat beyond the rear end of the clearance doors yet another strong deep-section bulkhead 20 is provided. Between the strong stiff bulkheads a number of light bulkheads 21 of narrow or shallow cross-section are provided. The strong and light bulkheads may be referred to as major and minor bulkheads, respectively. The bulkheads are covered by a skin blanket 22, comprising skin and stringers, which with the bulkheads form a strong stiff semi-monocoque construction.

The opening E is bordered by a strong stiff frame 25 which is firmly connected to the bulkheads and skin blanket. Near the rear end, specifically along a diagonal side, the clearance doors G are mounted on the frame by hinges 26. The doors, as thus mounted, swing inward and upward toward the side and rear, thus providing the maximum head room at the rear of the opening. The doors are each operated by a hinge-jointed strut 27 supported at its upper end upon the strong bulkhead 19. When the ramp is closed, the front edge of each clearance door is pushed down by its strut against a ledge 28 provided on the rear end of the ramp.

The support or anchorage joint 30 of the ramp strut 17 is strengthened by an inclined member 31 which is connected at its lower end to the bottom of the U-shaped bulkhead 18 and at its upper end is connected to the upper portion of the enclosed bulkhead 17 adjacent the skin sheet. Intermediate its ends where the member 31 stands clear inward from the outcurved body enclosure it is braced to the light bulkheads 21 by brackets 32. At the bottom the support joint 30 is braced by a member 33 which extends toward the frame 25 and is secured at its end to a light bulkhead 21 at the frame 25. Intermediate its ends, the member 33 is also secured to the other bulkheads which it passes. These inclined members not only provide strong support for the ramp but also strengthen and stiffen the body. Inasmuch as the ramp strut is rigid and power-operated, it can be made to press the end of the ramp against the ground and push the body upward at the rear to aid the wheels in maintaining the body in proper position while loading or unloading.

The rear portion of the body on each side is strengthened by braces 35, 36 and 37 connected at one end to the strong bulkhead 19 and at their other ends to other bulkheads. Where the braces 35 are secured to the bulkhead 21 adjacent the roof in the center there is supported a hoist 38 which may be used to assist in operating or holding the rear end of the ramp or for handling cargo through the opening. The braces 36 extend to the next forward strong bulkhead 18. The braces 37 extend downward toward the rear to a connection with a light bulkhead 21.

The ramp and clearance doors may be used in various ways as will be apparent in service. A few representative uses are illustrated in Figures 2 to 5.

In Figure 2, the ramp is lowered and a large package P is being pulled up the ramp by a cable 40 and a winch 41 which is secured to a full bulkhead 42 in the body. The winch is anchored at the point where a flight deck 43 is connected to the bulkhead, whereby to avoid undue deformation of the bulkhead when heavy loads are imposed on the winch. Even with the clearance doors closed, as shown in Figure 2, there is practically enough headroom for a normal man of approximately six feet height to walk into the body.

When the clearance doors are raised, as shown in Figure 3, there is enough headroom for a very large package P1 or even for a truck of considerable size. Say the cargo compartment cross-section is 8 ft. by 8 ft., there will be headroom of at least this height at the rear edge of the clearance opening.

Figure 4 shows a truck T backed beneath the clearance doors with the ramp raised to about the level of the floor in the body whereby goods may be transferred on a level from truck to the cargo body. Of course, the ramp may have any other inclination desired.

Figure 5 illustrates a condition which may often exist in flight. The ramp may be closed, yet either packages or persons may leave through the opening left beyond the end of the ramp when the clearance doors are raised. A package P2 is shown being dropped by parachute in this manner.

The hoist 38 is located in a convenient position to serve a variety of uses, such as to assist loading and unloading, as shown in Figure 3, or to assist in raising, lowering, or holding the ramp if a load is carried thereon.

The clearance doors are seldom, if ever, required to take any considerable load, consequently may be made much lighter than the ramp and body. For example, they may be made of press-shaped plywood.

In order to insure proper closing of the ramp and to assist in tying the body sides together through the strong ramp structure, pins 45 and corresponding holes 46 are provided between the side frame of the opening and the sides of the ramp.

While one embodiment of the invention has been described to illustrate the principles of the invention it is to be understood that the invention may have various embodiments within the limits of the prior art and the scope of the subjoined claims.

What is claimed is:

1. In an airplane in combination, a fuselage provided with a bottom opening, a ramp hinged at one end and serving as a closure for part of the opening, and clearance closure means separate from the ramp hinged in the rear end of the opening to close the remainder of the opening, said clearance closure means being mounted to swing inward to open and the ramp being mounted to swing outward to open.

2. In an airplane in combination, a fuselage provided with an upwardly inclined bottom side having an access opening therein, and closure means for said opening including a ramp mounted in the lower part of the opening to swing downwardly at its free end to open, and clearance closure means separate from the ramp mounted in the upper part of the opening to swing upwardly at its end adjacent the free end of the ramp to open.

3. In an airplane in combination, a fuselage provided with an upwardly inclined rear bottom side having an access opening therein, and closure means for said opening including a ramp at the front end opening downwardly at its rear end, and a pair of clearance doors opening upwardly at their front ends and inner edges.

4. In an airplane in combination, a fuselage provided with an upwardly inclined rear bottom side having an access opening therein, and closure means for said opening including a ramp hinged at its front end to swing down at its rear end to open, said ramp having a ledge at its rear end, and clearance doors hinged at the rear end of the opening to swing upward at their front end to open, the front end of said doors resting on the ramp ledge when closed.

5. In an airplane in combination, a fuselage provided with an upwardly inclined rear bottom side having an access opening therein, a ramp hinged at its front end in said opening and swinging downwardly at its rear end to open, screw struts on each side operatively connected to said ramp, a pair of clearance doors hinged at the rear end to swing upward at the front end and inner edges to open, and a breakable strut operatively connected to each door near the inner front end.

6. In an airplane in combination, a fuselage provided with a bottom opening, a ramp hinged in said opening to open downwardly at one end, operating supports connected to the ramp on each side near its mid-length, and clearance doors hinged adjacent the opposite end of the opening, said fuselage at said opening being of semi-monocoque construction comprising a skin blanket of skin and stringers and spaced girdle ribs or bulkheads, the bulkheads adjacent the end of the opening, at the ramp supports, and at the ramp end being deep and rigid and the adjacent intermediate bulkheads being shallow and light.

7. In an airplane in combination, a fuselage provided with a bottom opening, a strong frame bordering said opening, closure means for said opening, said fuselage above said opening comprising vertical bulkheads secured on the sides to said frame, a hoist mounted on the top of the fuselage interiorly above the mid-width of said opening, and strut means bracing the hoist mounting to adjacent bulkheads and to the sides of said frame.

8. In an airplane in combination, a body provided with a bottom opening, a ramp mounted for hinging movement in one end of the opening and forming part of the body shell when closed, and clearance closure means separate from the ramp mounted for hinging movement in the other end of the opening and forming part of the body shell when closed, the ramp and clearance closure means together completely closing the bottom opening.

9. In an airplane in combination, a body provided with an inclined bottom portion having an opening, a ramp hinged at the lower edge of the opening and forming part of the body shell when closed, and clearance closure means separate from the ramp mounted for hinging movement in the upper part of the opening and forming the remainder of the body shell for the opening when closed.

10. In an airplane in combination, a fuselage provided with a bottom opening, a ramp mounted for hinging movement at one end of the opening and forming part of the fuselage enclosure when retracted, and side-opening clearance closure means separate from the ramp mounted for hinging movement at the other end of the opening, the ramp and clearance closure means together completely closing the bottom opening.

11. In an airplane in combination, a fuselage provided with a bottom opening, a ramp hinged in said opening to open downwardly at one end, and operating supports connected to the ramp on each side near its mid-length, said fuselage at said opening being of semi-monocoque construction comprising a skin blanket and spaced ribs or bulkheads, the bulkheads at the ends and mid-portion of the ramp being of deep section and rigid and the intermediate bulkheads being of shallow section and light.

12. In an airplane in combination, a fuselage provided with a longitudinally elongated bottom opening, complete girdle bulkheads at the ends of the opening, U-shaped bulkheads located at longitudinally spaced points along the length of the opening, said girdle bulkheads and some of said U-shaped bulkheads being of deep section and strong and some of the bulkheads intermediate the deep-section bulkheads being of relatively shallow section and less strong than the deep-section bulkheads, and a stressed skin blanket secured on said bulkheads.

13. In an airplane in combination, a fuselage provided with a longitudinally elongated bottom opening, complete girdle bulkheads at the ends of the opening, U-shaped bulkheads located at longitudinally spaced points along the length of the opening, said girdle bulkheads and some of said U-shaped bulkheads being of deep section and strong and some of the bulkheads intermediate the deep-section bulkheads being of relatively shallow section and less strong than the deep-section bulkheads, and a stressed skin blanket secured on said bulkheads, said bottom opening being inclined and said bulkheads being approximately vertical.

14. In an airplane in combination, a fuselage provided with a longitudinally elongated bottom opening, complete girdle bulkheads at the ends of the opening, U-shaped bulkheads located at longitudinally spaced points along the length of the opening, said girdle bulkheads and some of said U-shaped bulkheads being of deep section and strong and some of the bulkheads intermediate the deep-section bulkheads being of relatively shallow section and less strong than the deep-section bulkheads, and a stressed skin blanket secured on said bulkheads, said bottom opening being reinforced by a strong rigid frame to which said bulkheads are attached.

15. In an airplane in combination, a body having a longitudinally elongated bottom opening, a border frame for said opening, complete girdle bulkheads at the fore and aft ends of the opening, U-shaped bulkheads located at longitudinally spaced points along the length of the opening between the fore and aft ends, all of said U-shaped bulkheads being secured at their spaced ends to the sides of said frame, a closure operably secured in said opening, and registry pins and holes arranged between the sides of the closure and the sides of the frame of the opening to transmit body strains through the closure structure when in closed position.

16. An airplane comprising in combination, a fuselage having a cargo compartment with a floor and an opening through an enclosing wall into the compartment at one end of the floor and extending upward from the floor, a ramp hinged to the fuselage at an edge of the opening at the floor and being of such length as to close part of the length of the opening and to extend at an inclination from the floor to the ground when swung downward about its hinges, and closure means hinged to the two side edges of said opening at the end away from the hinged end of the ramp in a position to be closed as a fairing over the part of the opening which is not closed by the ramp or to be opened to clear the line of passage over the ramp.

17. In an airplane in combination, a body provided with a bottom opening, a ramp mounted for hinging movement in one end of the opening and forming part of the body shell when closed, and clearance closure means separate from the ramp mounted for hinging movement relative to the opening and forming part of the body shell when closed, the ramp and clearance closure means together completely closing the bottom opening.

18. In an airplane in combination, a fuselage provided with a bottom opening, a ramp mounted for hinging movement at one end of the opening and forming part of the fuselage enclosure when retracted, and at the other end of the opening side-opening closure means separate from the ramp and mounted for hinging movement, the ramp and closure means together completely closing the bottom opening.

MICHAEL WATTER.

REFERENCES CITED

The following references are of record in the file of this patent:

UNITED STATES PATENTS

| Number | Name | Date |
|---|---|---|
| 2,095,440 | Hojnowski | Oct. 12, 1937 |
| 2,268,009 | Babb et al. | Dec. 30, 1941 |
| 2,315,117 | Freytag | Mar. 30, 1943 |
| 1,275,746 | Rainey | Aug. 13, 1918 |
| 2,196,546 | Bowers | Apr. 9, 1940 |
| 1,671,608 | Pratt | May 29, 1928 |
| 230,842 | Vanorman | Aug. 3, 1880 |
| 1,817,921 | Knaggs | Aug. 11, 1931 |
| 457,274 | Hall | Aug. 4, 1891 |
| 950,788 | Williams | Mar. 1, 1910 |
| 2,045,489 | Payette | June 23, 1936 |